May 14, 1963

G. F. HAGEMAN 3,089,340

THERMOMETER

Filed Nov. 21, 1960

GEORGE F. HAGEMAN
INVENTOR.

BY
Rudolph J. Juick
ATTORNEY

May 14, 1963   G. F. HAGEMAN   3,089,340
THERMOMETER

Filed Nov. 21, 1960   2 Sheets-Sheet 2

GEORGE F. HAGEMAN
INVENTOR.

BY
Rudolph J. Quick
ATTORNEY

United States Patent Office 3,089,340
Patented May 14, 1963

3,089,340
THERMOMETER
George F. Hageman, Union, N.J., assignor, by mesne assignments, to Daystrom, Incorporated, Murray Hill, N.J., a corporation of Texas
Filed Nov. 21, 1960, Ser. No. 70,763
5 Claims. (Cl. 73—363.9)

This invention relates to a thermometer and more particularly to a thermometer of the type known as a maximum-minimum thermometer which includes a pair of auxiliary pointers for indicating the maximum excursions of the main indicating pointer and a selectively-operable resetting arm for restoring such auxiliary pointers to a desired position relative to the instrument scale.

The thermometer is of the bimetallic type comprising a thin ribbon of bimetallic material wound in the form of a helical coil of one or more layers. One end of the coil is anchored to a suitable part of the thermometer housing while the other end is attached to a suitable indicating pointer which cooperates with a scale calibrated in temperature values. Temperature changes in the bimetallic helix result in rotation thereof and the attached indicating pointer. A pair of auxiliary pointers are positioned for drive engagement with the indicating pointer, the indicator pointer driving the one auxiliary pointer upscale and the other downscale with upscale and downscale rotation, respectively, of the indicating pointer whereby the maximum and minimum excursions of the indicating pointer are indicated by the position of the auxiliary pointers. A resetting arm provides means for returning the auxiliary pointers to a desired initial position.

The construction of auxiliary pointers and the mounting therefor, and the construction of an externally-operated resetting arrangement are subject to certain practical design limitations. In the first place, the auxiliary maximum and minimum pointers must remain in any fixed position until reset, even under conditions of vibration. At the same time, each such pointer must respond to rotational movement by the application of a very small force generated by the temperature-sensitive bimetallic coil as it will be apparent that any significant restraining force applied to the main indicating pointer by the auxiliary pointers will disturb the normal indicating accuracy of the instrument. Variable such restraining forces will further effect the reliability of the indications. Still further, the resetting arm must transmit sufficient force to the auxiliary pointers for resetting purposes, yet, must be designed to prevent damage to the main indicating pointer, and bimetallic element upon excessive rotation of a finger-operable knob.

In accordance with my invention, a leaf spring is included in the mounting arrangement for each of the auxiliary pointers, against which spring pivot bearing means supporting the auxiliary arms abut. The frictional force necessary to rotate the auxiliary pointers is easily adjusted by adjustment of the leaf spring pressure against the pivot bearing means. Furthermore, such leaf springs may be pivotably mounted on a supporting bracket such that the springs may be rotated aside for ease of assembly of the auxiliary pointers on the pivots. Furthermore, the reset arm of my invention simply comprises a resilient wire shaped so as to include a portion partially encircling an annular groove formed in a lug carried by a manually-rotatable reset knob. The reset arm is easily secured to the lug and relative rotary movement therebetween is provided upon excessive rotation of the finger-operable knob.

An object of this invention is the provision of a bimetallic thermometer comprising an auxiliary pointer movable by the main indicating pointer, and including novel pivoted mounting means for the auxiliary pointer.

An object of this invention is the provision of a novel reset mechanism for rotating the auxiliary pointer of a bimetallic thermometer of the type described above.

An object of this invention is the provision of a bimetallic thermometer having a main indicating pointer cooperating with a scale of temperature values, a pair of auxiliary pointers adapted for individual rotation relative to the scale in response to rotary movement of the main indicating pointer, and means including a mounting bracket and a pair of leaf springs secured thereto adjacent one end thereof, the other end of the leaf springs being spaced from the bracket, and the auxiliary arms being rotatably mounted between the bracket and leaf springs.

These and other objects and advantages will become apparent from the following description when taken with the accompanying drawings. It will be understood that the drawings are for purposes of description and are not to be construed as defining the scope or limits of the invention, reference being had for the latter purpose to the appended claims.

In the drawings wherein like reference characters denote like parts in the several views.

Figure 1:
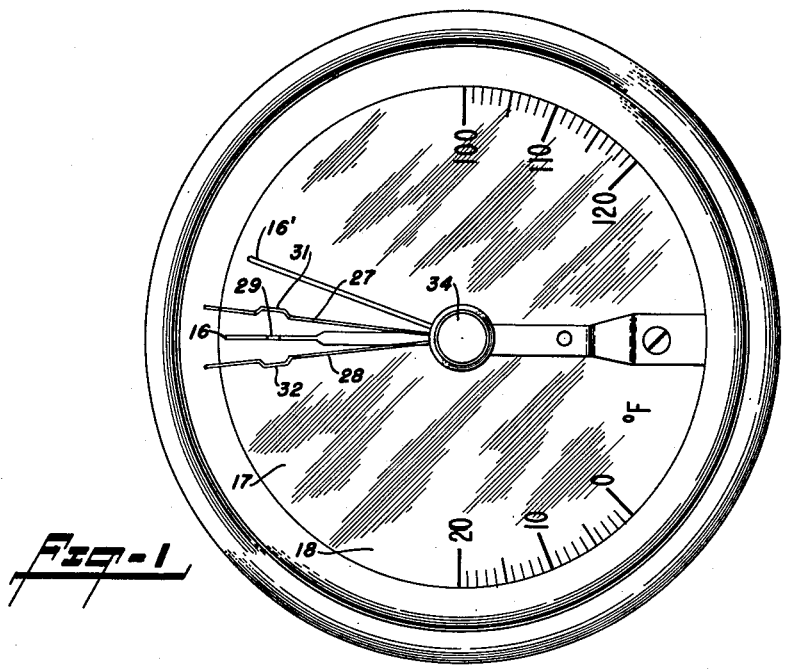
FIGURE 1 is a front view of a thermometer made in accordance with this invention.
Figure 2:
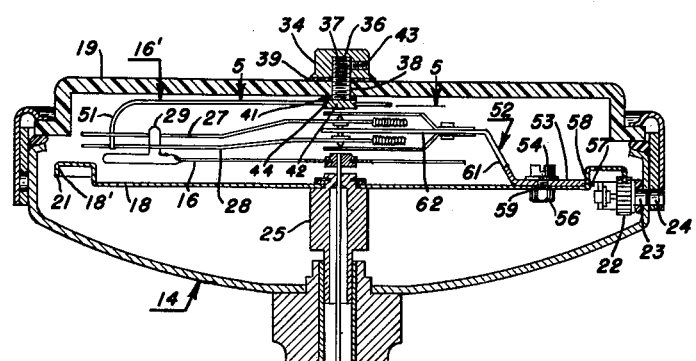
FIGURE 2 is a central cross-sectional view of the device drawn to an enlarged scale.

Reference is first made to FIGURES 1 and 2 of the drawings wherein the thermometer is shown comprising a tubular stem 10 in which a helical bimetallic coil 11 is mounted. As shown, one end of the coil is secured to a plug 12, as by soldering, or welding, said plug being soldered or brazed to the shell to close the end thereof. The other end of the coil is fastened to a staff 13 which extends into a casing 14. Secured to the end of the staff is a main indicating pointer 16 which cooperates with a scale 17 located on a scale plate 18 visible through a transparent cover 19 of the instrument. The scale is calibrated in temperature values through a desired range thereof. Gear teeth 21 are formed on the edge of the downwardly extending flange portion 18′ of the scale plate 18 for cooperation with a spur gear 22 mounted on a shaft 23 rotatable from exteriorly of the thermometer through a hole 24 found in the casing. The scale plate 18 is rotatably mounted on an extension 25 of the tubular stem 10, and is rotatably driven upon rotation of the gear 22. The rotatable scale plate provides means for recalibration of the thermometer in the event such recalibration becomes necessary through use or excess vibration of the thermometer. The instrument may be provided with a threaded hexagonal nut 26 which serves as a convenient means for attaching the thermometer to the wall of a vessel, apparatus, etc.

Auxiliary pointers 27 and 28 are mounted for rotation about an axis corresponding substantially to that of the main pointer 16. The main indicating pointer 16 carries an upwardly extending vane 29 having a path of travel intersecting the auxiliary pointers 27 and 28 at off-set portions 31 and 32, respectively, thereon. The off-set portions of the auxiliary pointers are of such a depth whereby the said pointers and main pointers are all in a superimposed position, as viewed from the front, when both off-set portions 31 and 32 abut the vane 29 for identical scale indications. Thus, if the pointer 16 is rotated to the 10 mark on the scale, in response to the action of the bimetallic coil, the auxiliary pointer 28 will likewise be rotated to the same such scale mark. A subsequent reverse rotation of the pointer 16 will leave the auxiliary pointer 28 at the 10 mark and, consequently, the auxiliary pointer 28 will indicate, at any given time, the minimum temperature to which the bimetallic coil has been subjected. Similarly, the auxiliary pointer 27 will indicate, at any given time, the maximum such temperature.

In order to reset the maximum and minimum pointers, there is provided a knob 34 having a threaded axial bore 36 into which a shaft 37 is threaded. The shaft 37 comprises a bolt which extends through a hole 38 formed in the transparent cover 19 and resilient washers 39 and 41 are provided on opposite sides of the cover in abutting relation with the knob and bolt head 42, respectively, to seal the opening 38 in the cover. The bolt 37 is threaded into the knob 34 sufficiently far to provide a clamping action on the cover, and is secured thereto by a set screw 43. Although the knob 34 with the attached bolt 37 are finger-operable, the clamping action of the same on the cover prevents any inadvertent rotation thereof.

Figure 5:
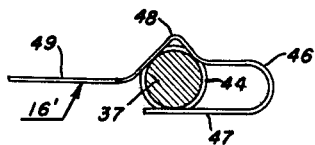
FIGURE 5 is a sectional view taken on line 5—5 of FIGURE 2.

An annular groove 44 having a semi-circular cross section is formed in the head 42 of the screw 37, within which groove the reset arm 16' is mounted. As seen in FIGURE 5, the reset arm is provided with a reverse bend 46 adjacent one end thereof, with the short free end portion 47 of the arm extending in the direction of the extended arm. A generally V-shaped bend 48 is provided in the arm 16' lying in the plane of the bend 46 and extending outwardly from the short free end portion 47. The long end portion 49 of the reset arm extends generally radially from the bolt 37, when the arm engages the groove 44 in a straddling manner. The arm 16' is made of sufficiently resilient material to clampingly engage the bolt at the groove therein. The three-point contact of the arm in the groove, with the arm engaging the groove at both sides of the V-shaped section 48 and at the free end 47 thereof, provides means for mounting the arm in a radially extending position with the bolt axis.

The reset arm 16' is provided with a downwardly extending end 51 (see FIGURE 2) for engagement with the auxiliary pointers 27 and 28 adjacent the ends thereof. When the reset arm 16' is rotated upon rotation of the knob 34, the end 51 will engage one of the auxiliary pointers which pointer is then driven by the reset arm. The auxiliary pointer is then driven into engagement with the vane 29 on the main indicating pointer. As viewed from the front in FIGURE 1, a clockwise rotation of the reset arm drives the auxiliary arm 28 into engagement with the main pointer vane 29, while a counterclockwise rotation thereof drives the auxiliary pointer 27 into engagement with the vane. The restraint against further rotational movement of the reset arm provided when the said auxiliary pointers engage the main indicator pointer, results in slippage between the arm 16' and the groove 44 in the bolt head as the bolt is continued to be rotated. The slipping engagement between the arm 16' and bolt head 42 prevents damage to the bimetallic coil 11 or change in the calibration thereof which might result if the element 11 were excessively rotated manually.

Figure 3:
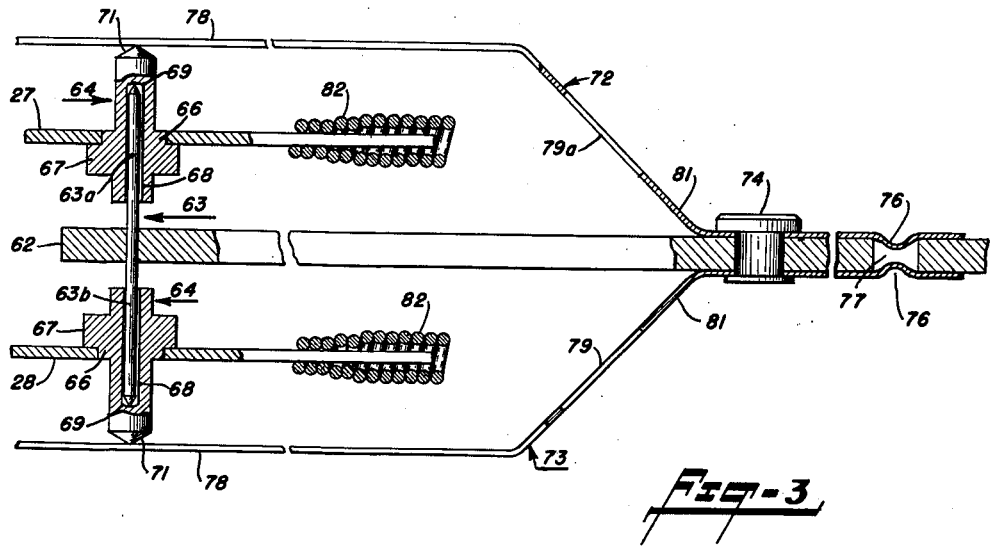
FIGURE 3 is an enlarged fragmentary sectional view of the novel auxiliary arm mounting means.
Figure 4:
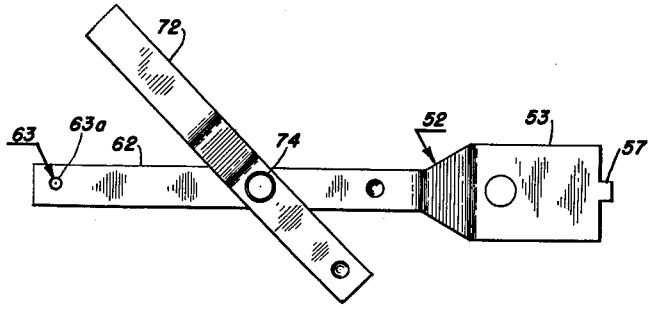
FIGURE 4 is a front view of the supporting bracket for the auxiliary arms and showing a leaf spring pivoted aside to permit assembly of an auxiliary arm thereon.

In addition to the above-described novel reset arm mounting means, the thermometer of my invention includes a novel mounting means for the auxiliary pointer arms 27 and 28. Referring to FIGURES 2-4, there is shown a bracket 52 having a base portion 53 secured by a bolt 54 and nut 56 fastening means to the scale plate 18. A tab 57 formed on the end of the base 53 extends through a hole 58 formed in the scale plate; the tab 57 and the bolt 54 which extends through a hole 59 in the scale plate accurately positioning the bracket on the scale plate.

An upwardly extending slanting portion 61 on the bracket 52 connects the base with a bracket portion 62 which extends over the pivot axis extended of the main pointer 16. An axially extending staff 63 is secured to the bracket portion 62 and extends upwardly and downwardly therefrom. Both ends of the staff 63 are pointed to provide a pair of pivots 63a and 63b for cooperation with bearing surfaces contained in combination bearing pivot members 64 to which the auxiliary pointer arms 27 and 28 are fixedly secured. The bearing-pivot members 64 are each provided with a first external radial flange 66 which extends through suitable holes in the auxiliary pointer arms and are secured thereto with the flat surface of the pointer arms in abutting relation with second external radial flanges 67 formed thereon. A staff receiving hole 68 is formed in the bearing-pivot members 64 within which opposite ends of the staff member 63 extend. A bearing surface 69 is formed in the bottom of each of the holes 68, upon which surfaces the pointed pivots 63a and 63b are seated.

The end of the bearing-pivot members 64 opposite the holes 68 are pointed as at 71, to form pivots which seat on leaf springs of identical construction but designated 72 and 73, respectively, for purposes of identification and description. The leaf springs are secured to opposite faces of the bracket 52 by means of a rivet 74. The rivet is not clenched so tightly, however, as to prevent rotation of the leaf springs thereabout. As seen in FIGURE 4, the leaf spring 72 may be pivoted about the rivet 74 to a position wherein the staff member 63 is accessible for the placement of a combination bearing-pivot member 64 (not shown) thereon. Ordinarily, the leaf springs are maintained in alignment with the bracket end 62 by means of detents comprising indentations 76 which cooperate with a hole 77 formed in the bracket. The leaf springs are sufficiently flexible to permit the indentations to ride up from out of the hole and over the bracket surface upon application of a sufficient rotary force on the outer free end of the springs. The pivots 71 of the members 64 seat upon the flat leaf spring surfaces of the extended ends, designated 78. No cooperating conical-shaped bearing surfaces for the pointed ends 71 are necessary since the portion of the staff 63a and 63b which extend into the clearance holes 68 in the members 64 maintain the axial alignment of the members 64 with the staff 63. Apertures 79 are formed in the offset portion 81 of the leaf springs to provide additional flexibility thereto. The frictional force necessary to prevent rotational displacement of the auxiliary pointers under conditions of vibration is a function of the load applied to the bearing-pivot members 64 by the leaf springs, and such load is adjustable by bending the said springs to provide the desired load. The tail portion of the auxiliary pointers may be provided with balance weights 82 for statically balancing the same.

Having now described the invention in detail, in accordance with the requirements of the Patent Statutes, various changes and modifications will suggest themselves to those skilled in this art. For example, the device is not limited to the illustrated scale range of 0–120 degrees Fahrenheit, and a rotatable scale plate obviously is not a necessary part of the construction. It is intended that these and other such changes may be made without departing from the spirit and scope of the invention as defined in the following claims.

I claim:

1. In a thermometer of the type comprising a temperature-sensitive element actuating a main pointer over a scale, an auxiliary pointer adapted for rotation by the main pointer, and a reset arm carried by a rotatable shaft which extends externally of the thermometer housing, said reset arm being adapted upon rotation to engage the auxiliary pointer; the improvement wherein the shaft includes a head having an annular groove formed therein, the said reset arm comprising a resilient wire formed with a reverse bend adjacent one end, means forming a generally V-shaped portion in the reset arm adjacent the reverse bend, the said arm straddling the head with the arm frictionally engaging the groove formed therein at the V-shaped portion of the arm.

2. In a thermometer of the type comprising a temperature-sensitive element actuating a main pointer over a scale, an auxiliary pointer adapted for rotation by the main pointer, and a reset arm rotatable from a part outside the thermometer housing, the said reset arm being adapted upon rotation to engage the auxiliary pointer; the improvement comprising a bracket secured to the scale and having a portion extending over the axis extended of the main pointer, a staff fixed to the bracket and extending axially of the pivot axis of the main pointer, a leaf spring secured to the bracket and extending past the end of the staff, a combination bearing-pivot member having an axial hole formed in one end thereof, means forming a bearing surface at the bottom of the hole in the bearing pivot, the said staff extending into the hole and seating on the bearing surface formed at the bottom thereof, and means forming a pivot at the other end of the bearing-pivot member, the said pivot engaging the said leaf spring.

3. The invention as recited in claim 2 wherein the leaf spring is pivotably secured to the bracket about an axis parallel to the staff axis, the leaf spring being pivoted from the staff axis to permit assembly of the bearing-pivot member on the staff.

4. The invention as recited in claim 3 including a detent maintaining the leaf spring in alignment with the bracket.

5. A maximum and minimum indicator arrangement and reset mechanism for a bimetallic thermometer of the type comprising a main pointer rotatable over a scale on a scale plate visible through a transparent cover closing the thermometer housing, the said indicator comprising a pair of auxiliary pointer arms, a bracket secured to the scale plate and extending over the pivot axis extended of the main pointer, a pair of leaf springs secured to opposite faces of the bracket and including free end portions spaced therefrom over the pivot axis extended of the main pointer, a staff secured to the bracket axially of the main pointer pivot axis and extending from both faces of the bracket, a pair of bearing-pivot members each having an axial hole therein extended from one end within which the staff extends and seats in the hole bottoms, the other end of the bearing-pivot members being formed with pointed pivots bearing against the leaf springs, a pair of auxiliary pivot arms secured to the individual bearing pivot members, the auxiliary pointers including an offset portion therein lying in the plane of rotation thereof, a vane on the main pointer adapted to engage the auxiliary pointers at the offset portions therein for rotation thereof, a rotatable shaft extending through the transparent cover axially of the main pointer axis, a head formed on the shaft within the housing, means forming an annular groove in the head of the shaft, and a reset arm comprising a resilient wire having a reverse bend thereof straddling the head with the wire in the groove therein, the free end of the reset arm including a downwardly extending portion for engagement with the auxiliary pointers for rotation thereof.

References Cited in the file of this patent
UNITED STATES PATENTS

| | | |
|---|---|---|
| 2,171,183 | Lamb | Aug. 29, 1939 |
| 2,706,962 | Kebbon | Apr. 26, 1955 |